United States Patent [19]
Kotheimer

[11] 3,746,929
[45] July 17, 1973

[54] GROUND CONTINUITY CHECKING SYSTEM

[75] Inventor: William C. Kotheimer, Lansdowne, Pa.

[73] Assignee: General Electric Company, Philadelphia, Pa.

[22] Filed: Sept. 28, 1971

[21] Appl. No.: 184,354

[52] U.S. Cl.............. 317/18 A, 317/18 C, 317/45
[51] Int. Cl. ............................................ H02h 3/16
[58] Field of Search............. 317/18 A, 18 C, 18 D, 317/45, 18 R; 324/51

[56] References Cited
UNITED STATES PATENTS
3,335,324   8/1967   Buckeridge ...................... 317/18 C
2,880,377   3/1959   Buckingham et al. ............ 317/45 X Primary Examiner—James D. Trammell
Attorney—Wesley Haubner et al.

[57] ABSTRACT

A fail-safe ground conductor continuity monitoring circuit including means for inserting a low-level monitoring current into a ground conductor and receiver means for sensing if the level of current in the ground conductor is below a predetermined level and for tripping a circuit breaker if the current is below that level for a predetermined period of time. The receiver also includes means for insuring that the current in the receiver does not reverse as a result of stray ground currents or power currents in the ground conductor.

8 Claims, 4 Drawing Figures

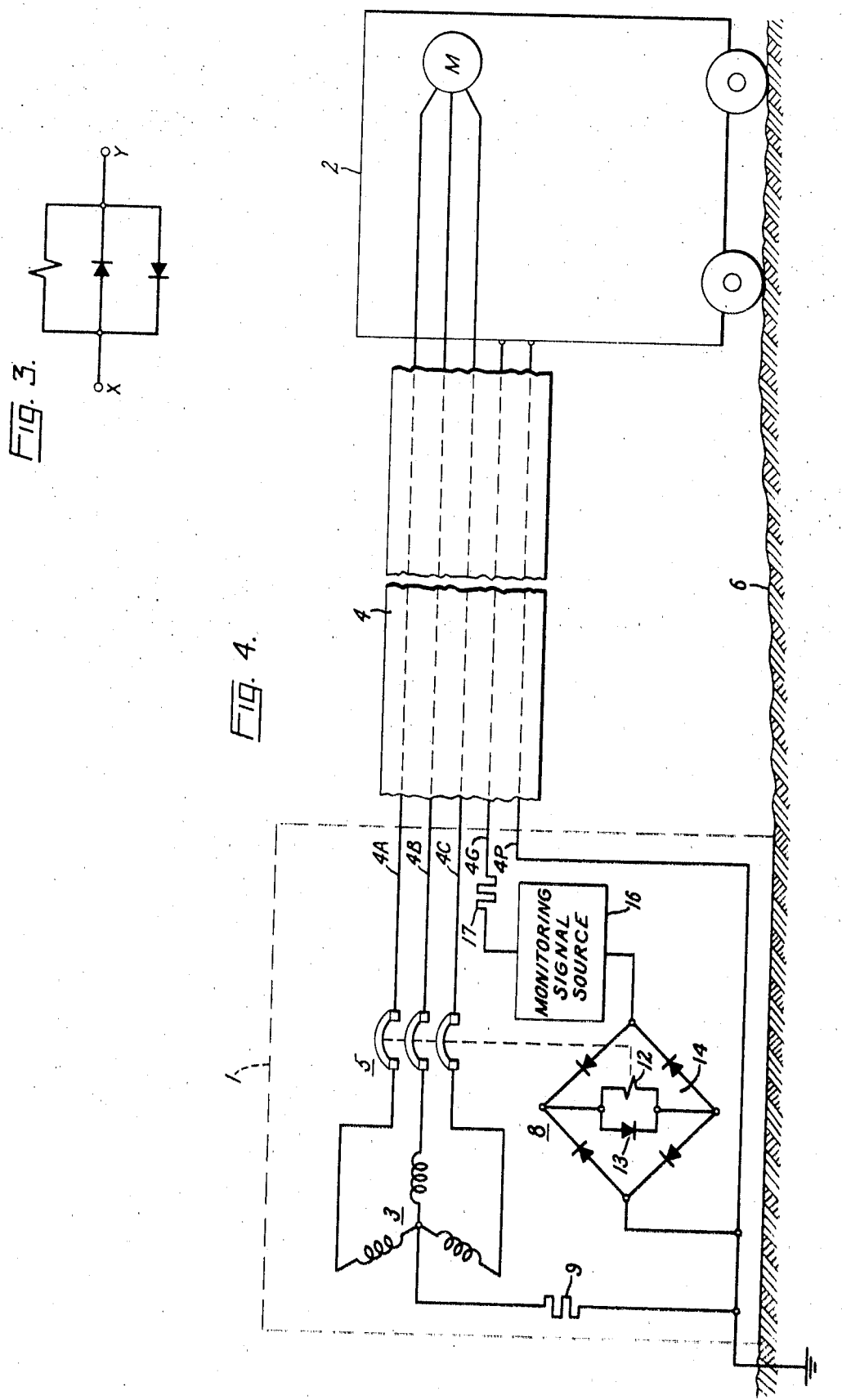

GROUND CONTINUITY CHECKING SYSTEM

BACKGROUND AND OBJECTS OF THE INVENTION

This invention relates generally to electrical protective circuitry, and more particularly it relates to fail-safe ground wire continuity checking circuitry. The following published art, now known to the applicant, are exemplary of prior art approaches relevant in this area of technology: U.S. Pat. Nos. 2,880,377 (Buckingham et al.); 3,131,329 (Braun); 3,158,806 (Conrad); 3,196,316 (Crom); 3,335,324 (Buckeridge); and 3,522,479 (Parker); 3,676,739 (Neuhouser).

In electrical equipment, particularly high voltage A-C equipment utilized in the mining industry, it is of utmost importance to adequately ground equipment in the furtherance of personnel and operating safety.

In most mines, power is normally provided to A-C mobile mining equipment via a long insulated trailing cable connected to a circuit breaker located at the mine load center. The circuit breaker is operative for interrupting the flow of load current to the mobile equipment upon command. The cable includes a ground conductor in addition to the phase conductors. The ground conductor is connected to the machine frame and serves to provide a path through which a fault current can flow to an earth connection located some distance from the mobile machine.

To assure that the mining machine is adequately grounded at all times, the continuity of the ground line from the machine to the load center should be continuously monitored. In the event of a break in the ground conductor the circuit breaker should open to quickly deenergize the mobile machine.

It should be appreciated that if a line-to-ground fault exists in the mining machine and if the ground conductor is broken, the frame of the machine will rise to the line voltage thereby subjecting operating personnel to a shock hazard. Accordingly, it is desirable to provide a continuous ground continuity checking circuit which quickly responds to the detection of a discontinuity in the ground conductor and which initiates a tripping operation of a circuit breaker to deenergize the mine machine in response to the detection of such a discontinuity (see Coal Mines Health & Safety Act 30 U.S.C. 868, 869).

Accordingly, it is a general object of my invention to provide an improved fail-safe ground continuity checking circuit.

One particularly expeditious manner of checking the continuity of a ground conductor is to provide a low-level current in the ground conductor while monitoring its presence. If the ground conductor is broken, the monitoring current ceases flowing and automatic means cause the mine load center circuit breaker to trip.

It has been discovered that stray current may flow in the ground wire due to the influence of sources external to the continuity checking circuit. If such stray current flows through the ground conductor in opposition to the monitoring current, it may appear that the ground cnductor is broken and the circuit breaker may be tripped. Such spurious tripping can result in costly delays in the mining operation. Such a spurious drop-out signal may also result from alternating power currents in the ground conductor, as due to unbalanced load or line-to-ground faults.

Accordingly, it is a further object of my invention to provide a fail-safe ground wire continuity checking circuit which minimizes the effect of externally originated stray currents and power circuit currents in producing spurious tripping of the system circuit breaker.

SUMMARY OF THE INVENTION

In carrying out my invention in one form, I provide an electrical protection circuit for checking the continuity of a ground conductor connected between a source of power and a remotely located piece of electrical machinery, and for initiating the deenergization of said machinery, via a system circuit breaker, in response to the detection of a discontinuity in the ground conductor.

The circuit includes means for producing a pulsating unidirectional monitoring current and for passing it through the ground conductor and a receiver, including relay means, for sensing the presence of such current and for initiating a tripping cycle of the system circuit breaker whenever the magnitude of the current flowing through the ground conductor is below a predetermined level for a predetermined period of time. The receiver also includes rectifying means coupled to the relay for insuring that any stray or power components of current which may flow through the ground wire will not flow in opposition to the monitoring current in the relay, thereby minimizing the possibility of spurious tripping of the system circuit breaker.

BRIEF DESCRIPTION OF THE DRAWINGS

My invention will be better understood and its various objects and advantages will be more fully appreciated from the following description taken in conjunction with the accompanying drawings in which:

FIG. 3 is a schematic diagram of a receiver which will be compared with the receiver arrangement shown in FIG. 1; and FIG. 4 is a schematic diagram of another form of my invention.

DETAILED DESCRIPTION OF THE PREFERRED EMBODIMENTS

Figure 1:
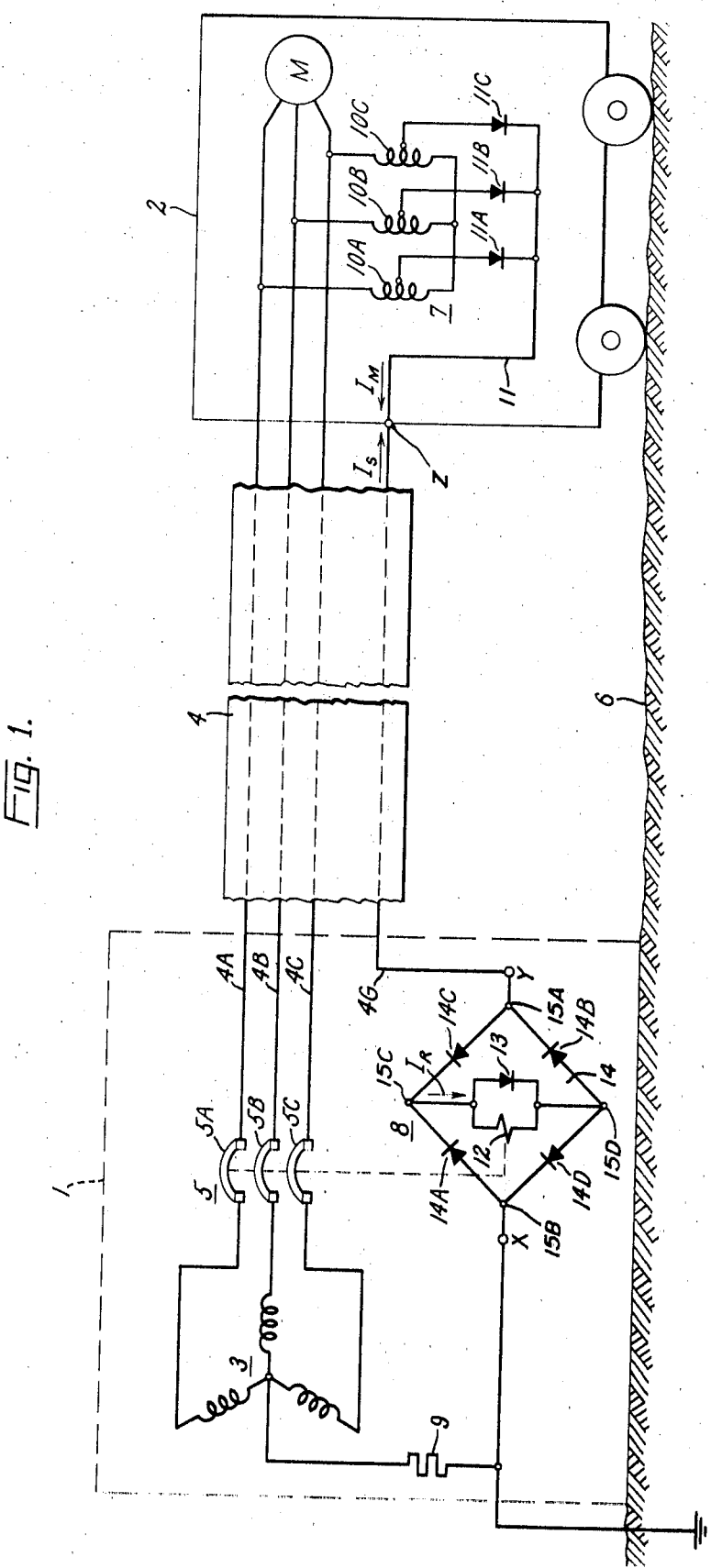
FIG. 1 is a schematic diagram of one form of my invention.

FIG. 1 is a schematic diagram of a portion of a power system particularly adapted, although not limited to, mining applications. As can be seen, a mine load center 1 provides 3-phase, A-C power to a remote mobile mining machine 2. Power is supplied to the mobile machine from a 3-phase transformer 3 in the load center via a circuit breaker 5 and an insulated cable 4. Cable 4 contains power conductors 4A, 4B and 4C and a ground conductor 4G. The ground conductor is electrically connected to the mining machine frame and to the earth at a remote point at the load center or supply location.

In service the cable 4 will be flexed a great number of times and dragged over relatively rough terrain (i.e., earth 6) as the mobile machine 2 is operated in the mine such that the ground wire 4G may be cut or broken, thereby destroying the ground integrity of the system.

Serious shock hazard to personnel will arise at the machine where the ground integrity between the machine and the load center fails. In such circumstances personnel coming in contact with the mobile machine may receive a lethal shock in the event that, for example, the current from the power conductor becomes connected to the frame of the machine. Furthermore, the absence of ground integrity in an underground mining application creates a condition fraught with the peril of fire and/or gas explosions resulting from electrical arcing under fault conditions. Accordingly, it is of utmost importance to provide the power system with a fail-safe ground continuity monitoring circuit which causes deenergization of the mobile mining machine in the event that the integrity of the ground system is compromised.

To that end I provide a continuous monitor ground continuity check circuit adapted for initiating a tripping cycle of the system circuit breaker in rapid response to the detection of a discontinuity in the ground wire 4G. My circuit includes a transmitter 7 which is preferably disposed on the mobile mining machine 2 and which is adapted for inserting a low level monitoring signal current $I_M$ into the system ground conductor. A sensitive receiver 8 is connected in the ground wire 4G at the mine load center 1 to monitor presence of the injected signal current $I_M$ and to trip the circuit breaker 5 in response to absence of signal current or signal currents below a predetermined minimum magnitude.

As in many conventional grounding systems, a grounding resistor 9 is connected between the neutral of the system transformer and the ground conductor so that the ground conductor 4G serves also as a neutral power circuit conductor. The function of the grounding resistor is to limit any line-to-ground fault current which may begin flowing.

Transmitter 7 comprises a wye connected transformer 10 having windings 10A, 10B and 10C from which intermediate voltage taps are connected through diodes 11A, 11B and 11C, respectively, to a common neutral conductor 11. The common neutral conductor 11 is connected to the frame of machine 2 and thus to the similarly connected ground conductor 4G at a terminal Z. The diodes 11A, 11B and 11C thus supply to the common neutral conductor and to the ground conductor 4G a unidirectional signal current $I_M$ having an alternating component or ripple (see FIG. 2B), the ripple frequency being a harmonic of the power frequency.

The D-C signal current $I_M$ current flows through the ground conductor 4G to the neutral of the power transformer 3. At the mine load center 1, the ground conductor 4G is connected to a terminal Y of the receiver 8. A companion terminal X of the receiver is connected to ground via a circuit which exhibits relatively low impedance to ground current in the ground conductor, and it is also connected to the neutral of the system transformer 3 via conductive means comprising the resistor 9. The D-C signal current $I_M$ will therefore circulate through the ground conductor 4G, the receiver 8, the resistor 9, and back to the transmitter 7 by way of the power conductors 4A, 4B, and 4C. The receiver 8 itself, as will soon be explained, is designed to present a low impedance to ground current, and this insures that the potential on the frame of the machine 2 is not raised appreciably above ground.

The receiver 8 includes a relay which is operative, when the current through its coil 12 is below a predetermined deenergization drop-out level for a predetermined period of time, to actuate a suitable tripping mechanical (not shown) for the circuit breaker 5 thereby to open the contacts 5A, 5B and 5C and to deenergize the mobile mining machine 2.

During normal operation of the power system with the ground conductor intact, the current through the relay coil 12 will be above the deenergization level. If the ground wire were broken, the absence of current flow through the relay coil will cause the relay to drop out and initiate a tripping cycle of the system circuit breaker.

As can be seen relay coil 12 is shunted by a diode 13. The function of diode 13 is to clamp, or limit, the voltage appearing across the relay coil. In so doing the relay coil is protected from sustaining injury in the event that a high level current (e.g., power fault current) flows through the ground conductor. The receiver also includes 4 diodes, namely, 14A, 14B, 14C, and 14D arranged to form a bridge rectifier 14 - (the function of the rectifier 14 will be considered in detail later).

The current which flows through the subcircuit composed of the parallel combination of the relay coil 12 and diode 13 is denoted as current $I_R$ and is equal to the rectified sum of all the currents flowing in the ground conductor 4G.

In operation practically no portion of current $I_R$ is bypassed away from the relay coil 12 by diode 13 until the voltage exceeds approximately 0.6 volts. At this point the voltage on relay coil 12 is held almost constant and a large portion of current $I_R$ will flow through diode 13.

As previously noted I purposely insert a current $I_M$ into the ground conductor for monitoring purposes, but there may be stray or fault currents in the ground wire as well. When the ground conductor serves also as the power circuit neutral it may also carry unbalanced load currents. Such currents may be at least at times, opposite in direction with respect to the unidirectional signal current $I_M$ and thus have the effect of causing spurious or nuisance tripping even though the ground conductor is intact, unless measures are not taken to disconnect their existence.

Figure 2:
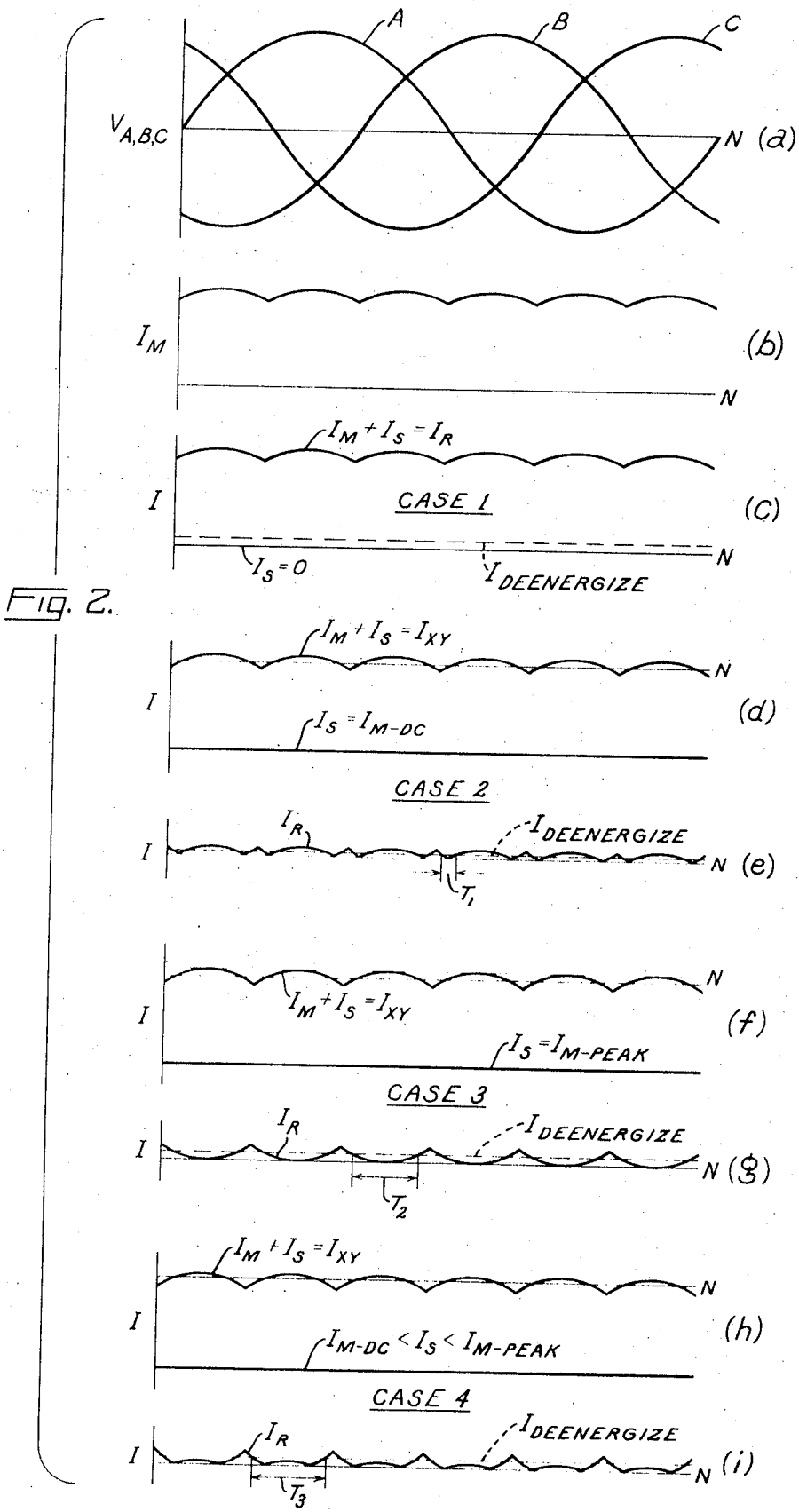
FIG. 2 is a graphical representation of wave forms existent in certain portions of the circuitry shown in FIG. 1 for a variety of stray current conditions.

The stray currents to which I refer for illustration are denoted and shown schematically as $I_S$ in FIGS. 1 and 2. Such currents may result from incidental and normal contact between the A-C operated mining machine and D-C operated equipment, such as mine railway equipment. The return in for such stray currents is through the earth, which is underground mines is a relatively good conductor.

As should be appreciated, if the direction of the stray current flow is in opposition to the direction of the monitoring current flow, the net current flowing through the ground conductor, denoted at FIG. 2 as $I_{XY}$, may fall below the deenergization level of the receiver relay. If the net current is below the deenergization level of the relay for a sufficient time, the relay will drop out and accordingly initiate a trip cycle in the system circuit breaker.

In the interest of mining economy, the possibility of such spurious tripping operations must be minimized if not eliminated. To that end the receiver 8 includes circuitry which insures that any stray current which may flow through the ground conductor will not result in the deenergization of the relay in the absence of a ground conductor discontinuity. That circuitry comprises the previously mentioned diode bridge 14. As can be seen, the bridge includes a pair of A-C terminals, 15A and 15B, and a pair of D-C terminals, 15C and 15D. The bridge is conductively connected in series in the ground conductor 4G through its A-C terminals 15A and 15B. The parallel combination of the relay coil 12 and its associated clamping diode 13 is connected between the D-C terminals 15C and 15D of the bridge.

With the diode bridge arranged in the above-noted manner, the composite of all currents which are flowing through the ground conductor is rectified, whereupon the relay coil is subjected to only unidirectional current. As should be appreciated, stray current components in opposition to the signal current $I_M$, if allowed to traverse the relay coil 12 directly would have the effect of reducing or reversing the flux in the coil and may result in deenergization of the relay and tripping of the system circuit breaker. Since the relay coil of my invention is not subjected to any reverse current components, the chance of spurious tripping due to stray current is precluded.

Furthermore, it should be noted that the impedance of my receiver is limited to an acceptably low magnitude, equal to the forward resistances of the clamping diode and two serially connected bridge diodes. This arrangement insures that the voltage drop across the receiver (i.e., the voltage across points X and Y) will be relatively small so as not to cause the voltage on the frame of the mobile mining machine to rise to a dangerously high level above ground in the event of a line-to-ground fault.

Operation of the signal receiver of my invention will be more fully understood by reference to FIG. 2 which is a graphical representation of voltage and current wave forms in the receiver 8 under several stray current conditions.

FIG. 2a shows the 3 phase voltages to neutral in the power conductors A, B, and C.

FIG. 2b shows the rectified signal current $I_M$ produced by transmitter 7 and which serves as the monitoring current.

In FIG. 2c there is shown the relay current $I_R$ for the case (denoted as Case 1) wherein no stray ground current is flowing. As can be seen, current $I_R$ is positive at all times and is above the deenergization level of the receiver relay. Accordingly, the relay will remain energized and the tripping cycle will not be initiated unless and until the current $I_R$ drops below the deenergization level of the relay and remains below that level for a time sufficient for the relay to drop out. As will appear hereinafter, the deenergization or drop-out level of the receiver relay is a low current less in magnitude than the maximum of the alternating (ripple) component of signal current and preferably about equal to the average value of the alternating component.

In FIG. 2d there is shown the composite current $I_{XY}$ for the case (denoted as Case 2) wherein a stray current $I_S$, being of equal magnitude but at opposite polarity to the average value of the monitoring current, is flowing through the ground conductor. Accordingly, composite signal $I_{XY}$ will be of alternating polarity and centered about zero.

If the ground monitoring receiver was constructed as shown in accordance with FIG. 3, (i.e., including a relay coil shunted by a pair of inversely poled diodes, and connected between terminals X and Y), the negative portion of the composite signal $I_{XY}$ would act to reverse the flux in the relay's core which may result in the relay's deenergization.

The bridge rectifier 14 in my receiver 8 serves to obviate such problems by rectifying the negative portion of the composite current $I_{XY}$. Therefore, the current $I_R$ flowing through the relay coil 12 never reverses (i.e. it is always positive), although it does go below the deenergization level of the relay for a portion, $T_1$, of each cycle as seen in FIG. 2e. However, even though the current $I_R$ is below the deenergization level of the interval $T_1$ the deenergization time of the relay (i.e. the time between the instant the current level goes below the deenergization level and the instant the relay begins to drop out) is longer than $T_1$. Therefore, the relay will remain picked up, notwithstanding the presence of stray current whose magntude is equal to the average value of the monitoring current.

As was previously noted, the D-C monitoring current includes an A-C component (ripple). This is necessary to insure that some unidirectional current will exist at all times to energize the relay coil if the ground conductor is intact. If there were no ripple in the D-C monitoring current and if the stray current was of opposite polarity and equal in magnitude to the monitoring current, the net relay current would be zero and the relay would drop out if such a condition existed for longer than the relay's deenergization time.

FIGS. 2f and 2g show the condition, denoted as Cased 3, wherein the stray current is of a magnitude equal to the peak value of the monitoring current $I_M$. In such a case the composite current, $I_{XY}$, will bee nagative at all times as shown in FIG. 2f and the rectified signal $I_R$ will be positive at all times as shown in FIG. 2g. As can be seen therein, the current $I_R$ is below the deenergization level of the receiver relay for the interval denoted as $T_2$ (which is longer than $T_1$ of Case 2). So long as the receiver relay has a deenergization time which is longer than the interval $T_2$ it will not drop out.

It will of course be evident to those skilled in the art that any stray or power current components in ground conductor 4G greater in magnitude than the peak monitoring current will provide a resultant current greater than zero whether it aids or opposes l monitor current. If such a dominant extraneous current opposes TM the net ground conductor current will still traverse the relay coil 12 in the proper forward direction due to action of the diode bridge 14.

It has been found that if the stray current is of a magnitude which is less than the peak value of the monitoring current but greater than its D-C component and is of opposite polarity, the relay will be most prone to drop out. Such a condition is shown in FIGS. 2h and 2i. As can be seen therein the composite current $I_{XY}$ is of alternating polarity with its trough portion being negative and greater than its positive crest portion.

FIG. 2i shows the current $I_R$ in Case 3, which is the composite current $I_{XY}$ with the negative portion thereof rectified. As can be seen, the time interval during which the current $I_R$ is below the deenergization level of the relay, denoted as $T_3$, is longer than $T_2$. In fact $T_3$ is the maximum time interval that the current through the relay will be below the deenergization level of the relay for any magnitude or polarity of stray current which may flow in the ground conductor. Accordingly, if a relay is chosen so as to have the deenergization time greater than $T_3$ and preferably equal to or greater than the cycle time of the ripple frequency, the relay should not drop out as a result of influence of stray ground currents.

In the interst of safety it is desirable that the diodes 14A, 14B, 14C, 14D be able to carry a large amount of current (such as would exist under a fault condition) without failing or if they do fail, to fail in a shortened condition, thereby maintaining the integrity of the grouding system.

FIG. 4 is a schematic diagram of a mining power system similar to that shown in FIG. 1. However, the cable and the ground continuity checking circuit therein includes a check wire or pilot conductor 4P, as well as a ground conductor 4G. This type of system is known as a "pilot wire system."

In the pilot wire system shown the pilot conductor 4P is provided to supply the monitoring current $I_M$ to the ground conductor and to complete the path through which the monitoring current can flow. In contradistinction, in the system of FIG. 1 the monitoring current $I_M$ is provided via the 3-phase power conductors which themselves form a return path for the monitoring current $I_M$.

The monitoring current in the pilot wire system of FIG. 4 is provided by a monitoring signal source 16 which is independent of the power circuit breaker 5. A current limiting resistor 17 in series with the monitor signal source 16 serves to limit the current from the monitoring signal source to an acceptable magnitude. The monitoring current may either by A-C or D-C, as desired.

In operation the monitoring signal source of FIG. 4 is separate from the power circuit. The receiver 8 of FIG. 4 is of identical configuration to the receiver 8 of FIG. 1 but may be constructed of lower power diodes. Since the receiver is in the pilot wire path it is not subjected to high levels of current which flow through the ground conductor in the event that a fault exists (e.g. a phase conductor of the cable being shorted to the mine machine's frame).

Receiver of FIG. 4 operates in a similar manner to that described with reference to FIG. 1, i.e. diode 13 clamps the voltage on the relay coil 12 and diode bridge 14 insures that the relay only is subjected to unidirectional current irrespective of the sense or magnitude of stray current in the ground conductor.

It will now be evident to those skilled in the art that when my improved signal current receiver is normally energized by a unidirectional signal current having a ripple component and is set to drop-out only with predetermined time delay and in response to a low current level less than the maximum of the ripple component, it will not drop-out due to extraneous current components in the ground conductor, whether the extraneous currents be greater or smaller than the signal current and whether in aiding or opposing relation. This is true whether the superposed currents be from stray sources or are power currents due to ground fault or unbalanced load and whetheer they be unidirectional or alternating in character.

The ground monitor circuit described and claimed in the instant application is also disclosed in a copending application, Ser. No. 196,287 filed by L.L. Mankoff et al. on Nov. 8, 1971 and assigned to the same assignee as the instant application. The mankoff et al application discloses and claims certain improvement features not disclosed in the instant application.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim and desire to secure by Letters Patent of the United States is:

1. In a system for supplying electric power from a fixed source location through a cable including a ground conductor to a remote load device having a conductive frame, said ground conductor being connected to said frame, a source of alternating electric power current supply at said source loaction, a source of pulsating unidirectional signal current including an alternating component having a ripple frequency, a ground monitor circuit including said ground conductor connected normally to conduct said signal current, a bridge rectifier having alternating current input terminals directly conductively connected in said ground monitor circuit and including direct current output terminals, and a normally energized signal current responsive relay connected across said direct current output terminals, the drop-out current of said relay being less than the maximum value of said alternating signal current component and said relay having a drop-out time characteristic at least substantially equal to the cycle time of said ripple frequency.

2. An electric power system according to claim 1 wherein said source of signal current comprises rectifier means having an input circuit connected to said source of power current.

3. An electric power system according to claim 2 wherein said power current source is multiphase and said ripple frequency is a harmonic of the power current frequency.

4. An electric power system according to claim 1 wherein the alternating current input terminals of said bridge rectifier are conductively connected directly between said ground conductor and a ground terminal at said source location.

5. An electric power system according to claim 1 wherein said signal current responsive relay comprises a coil connected in parallel circuit relation with a voltage limiting impedance.

6. An electric power system according to claim 5 wherein said voltage limiting impedance comprises a diode rectifier connected to conduct in the forward direction between the direct current output terminals of said bridge rectifier.

7. A ground monitor circuit according to between 1 wherein said ground monitor circuit comprises a loop circuit extending between said source location and said load device including ground conductor and a substantially coextensive pilot wire and said bridge rectifier is located at said source location.

8. A ground monitor circuit according to claim 7 wherein said signal current source is conductively independent of the main power circuit.

* * * * *